United States Patent [19]

Lockhart

[11] Patent Number: 4,472,564
[45] Date of Patent: Sep. 18, 1984

[54] METHOD FOR MAKING AN ENOXY STABILIZED ROOM TEMPERATURE VULCANIZABLE ORGANOPOLYSILOXANE COMPOSITION WHICH RESISTS COLOR CHANGE UPON AGING

[75] Inventor: Thomas P. Lockhart, Schenectady, N.Y.

[73] Assignee: General Electric Company, Schenectady, N.Y.

[21] Appl. No.: 481,526

[22] Filed: Apr. 1, 1983

[51] Int. Cl.$^3$ .................. C08G 77/04; C08L 83/04
[52] U.S. Cl. ............................ 528/18; 528/21; 528/23; 528/33; 528/34; 528/901
[58] Field of Search .............. 528/18, 21, 23, 33, 528/34, 901

[56] References Cited

U.S. PATENT DOCUMENTS

| | | |
|---|---|---|
| 2,607,792 | 8/1952 | Warrick . |
| 3,035,016 | 5/1962 | Bruner . |
| 3,065,194 | 11/1962 | Nitzsche et al. . |
| 3,070,559 | 12/1962 | Nitzsche et al. . |
| 3,122,522 | 2/1964 | Brown et al. . |
| 3,127,363 | 3/1964 | Nitzsche et al. . |
| 3,133,891 | 5/1964 | Ceyzeriat . |
| 3,153,007 | 10/1964 | Boot . |
| 3,161,614 | 12/1964 | Brown . |
| 3,184,427 | 5/1965 | Russell et al. . |
| 3,240,731 | 3/1966 | Nitzsche et al. . |
| 3,296,161 | 1/1967 | Kulpa . |
| 3,296,195 | 1/1967 | Goossens . |
| 3,334,067 | 8/1967 | Weyenberg . |
| 3,438,930 | 4/1969 | Beers . |
| 3,518,286 | 6/1970 | Pande et al. . |
| 3,542,901 | 11/1970 | Cooper et al. . |
| 3,632,557 | 6/1972 | Brode et al. . |
| 3,647,917 | 3/1972 | Schulz et al. . |
| 3,677,996 | 7/1972 | Kaiser et al. . |
| 3,689,454 | 9/1972 | Smith et al. . |
| 3,779,986 | 12/1973 | Smith et al. . |
| 3,819,563 | 6/1974 | Takago et al. . |
| 3,886,118 | 5/1975 | Nitzsche et al. . |
| 3,962,160 | 6/1976 | Beers et al. ............ 528/34 |
| 4,180,642 | 12/1979 | Takago . |
| 4,223,122 | 9/1980 | Cella . |
| 4,248,993 | 2/1981 | Takago . |
| 4,257,932 | 3/1981 | Beers . |
| 4,257,957 | 3/1981 | Cella . |
| 4,294,975 | 10/1981 | Takago . |
| 4,301,269 | 11/1981 | Hashimoto et al. . |
| 4,302,571 | 11/1981 | Arai et al. . |
| 4,304,920 | 12/1981 | Arai et al. . |
| 4,323,488 | 4/1982 | Takago et al. . |
| 4,339,563 | 7/1982 | Takago et al. . |
| 4,395,526 | 7/1983 | White et al. ............ 528/18 |
| 4,417,042 | 11/1983 | Dziark ................... 528/18 |

FOREIGN PATENT DOCUMENTS 2640328 8/1976 Fed. Rep. of Germany .

OTHER PUBLICATIONS

Chemistry and Technology of Silicones, W. Noll, Academic Press, New York, 1968, p. 397.
Encyclopedia of Chemical Technology, Kirk-Othmer, 3rd Ed., vol. 13, John Wiley & Sons, New York, pp. 874–893.
Reagents for Organic Synthesis, Fieser et al., J. Wiley, NY, 1967, pp. 703–705, vol. 1.
Advanced Organic Chemistry, 2nd Ed., J. March, McGraw-Hill, 1977, pp. 1184, 923–925, 936–937 and 940.
Chemistry & Technology of Silicones, W. Noll, Academic Press, 1968, pp. 99–100.

*Primary Examiner*—Herbert J. Lilling
*Attorney, Agent, or Firm*—William A. Teoli; James C. Davis, Jr.; James Magee, Jr.

[57] ABSTRACT

A method is provided for making a room temperature vulcanizable organopolysiloxane composition which is stabilized with an enoxy containing scavenger for hydroxy radicals which is used in combination with certain cure accelerators. The room temperature vulcanizable organopolysiloxane compositions can be allowed to age over an extended period of time under ambient conditions without any significant change in color occurring in the resulting room temperature vulcanizable composition.

11 Claims, No Drawings

METHOD FOR MAKING AN ENOXY STABILIZED ROOM TEMPERATURE VULCANIZABLE ORGANOPOLYSILOXANE COMPOSITION WHICH RESISTS COLOR CHANGE UPON AGING

CROSS REFERENCE TO RELATED APPLICATIONS

Reference is made to copending application of John E. Hallgren, Ser. No. 277,525 now U.S. Pat. No. 4,377,706, for Polyalkoxysilylenolethers and method for making, White et al, Ser. No. 277,524 now U.S. Pat. No. 4,395,042, for One Package, Stable, Moisture Curable, Polyalkoxy-Terminated Organopolysiloxane Compositions and Method for Making, filed concurrently on June 26, 1981, and John J. Dziark, for Scavengers for One Component Alkoxy Functional RTV Compositions and Process, Serial No. 349,695 now U.S. Pat. No. 4,417,042 filed Feb. 17, 1982. Reference is also made to the copending application of Mary Ann White et al, Ser. No. 481,524 and my copending applications Ser. No. 481,530 Ser. No. 481,528 and Ser. No. 481,529 for One Package, Stable Moisture Curable, Alkoxy-Terminated Organopolysiloxane Compositions where all of these applications are filed concurrently herewith, assigned to the same assignee as the present invention and incorporated herein by reference.

BACKGROUND OF THE INVENTION

Prior to the present invention, various one and two-package moisture curable room temperature vulcanizable (RTV) compositions were available based on the use of a silanol-terminated polydiorganosiloxane having the formula,

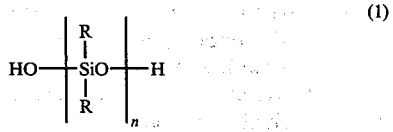

(1)

where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500, with a cross-linking silane having hydrolyzable radicals attached to silicon.

Ceyzeriat, U.S. Pat. No. 3,133,891 and Bruner, U.S. Pat. No. 3,035,016, are based on the use of methyltriacetoxysilane with a silanol-terminated polydimethylsiloxane under substantially anhydrous conditions. Although the one-package compositions of Bruner or Ceyzeriat, upon exposure to atmospheric moisture, provide satisfactory one-package room temperature vulcanizable organopolysiloxane compositions exhibiting satisfactory tack-free time, for example, 30 minutes or less after an extended shelf period, the acetic acid by-product is corrosive and has a disagreeable odor.

Other variations of one-package acyloxy acid generating RTV's are shown by Kulpa, U.S. Pat. No. 3,296,161, Goossens, U.S. Pat. No. 3,296,195 and Beers, U.S. Pat. No. 3,438,930, assigned to the same assignee as the present invention. Additional one-package acyloxy acid generating RTV compositions are shown by Schulz et al, U.S. Pat. No. 3,647,917 and Nitzsche et al U.S. Pat. No. 3,886,118.

An improved, low odor, substantially noncorrosive one-package RTV composition is shown by Beers, U.S. Pat. 4,257,932, assigned to the same assignee as the present invention. Beers achieves a reduction in odor and corrosive properties by utilizing as a crosslinking silane, a less volatile material such as methyltris-(2-ethylhexanoxy) silane.

A non-corrosive two package moisture curable organopolysiloxane composition free of carboxylic acid generating groups is shown by Nitzsche et al, U.S. Pat. No. 3,127,363 which is based on the use of a polyalkoxysilane, or polysilicate cross linking agent, in place of methyltriacetoxysilane. The ingredients of the two package noncorrosive composition of Nitzsche et al, are mixed under atmospheric conditions and the resulting composition must be used soon after the ingredients are mixed because the resulting blend has a short shelf life. Although the mixture of Nitzsche et al, which is typically polyalkoxysilane, silanol-terminated polydiorganosiloxane and tin soap catalyst, provides upon mixing, a fast curing non-corrosive room temperature vulcanizable composition, the Nitzsche et al mixture does not have the extended shelf life advantage of the one package system which is required for various commercial uses and therefore is excluded from a variety of applications.

Nitzsche et al, U.S. Pat. No. 3,065,194, teaches that a mixture of an endblocked dimethylsiloxane polymer, such as hydroxy and alkoxy endblocked, inert filler, ethylorthosilicate and dibutyltindilaurate can be vulcanized upon contact with water, after a 14 day shelf period at room temperature. However, the various ingredients of the mixture have to be vigorously dried by heating for 1 hour at 200° C., and the RTV, after a relatively short shelf period, has to be drenched with water.

Improved results toward combining the advantages of a non-corrosive acid-free polyalkoxysilane cross-linking agent with a silanol-terminated polydiorganosiloxane as a one-package system are shown by Weyenberg, U.S. Pat. No. 3,334,067, Cooper et al, U.S. Pat. No. 3,542,901 and by Smith et al U.S. Pat. Nos. 3,689,454, and 3,779,986, the last two being assigned to the same assignee as the present invention, utilizing a titanium chelate catalyst in place of a tin catalyst. However, after room temperature vulcanizable one-package systems based on a titanium chelate catalyst were allowed to age for a period of 5 hours or more, it was found that the tack-free time of the aged RTV was considerably longer than the tack-free time of the same mixture after it was initially mixed and immediately exposed to atmospheric moisture.

As shown by Brown et al U.S. Pat. No. 3,122,522, a platinum catalyst is used to prepare an alkoxy terminated silalkylenepolysiloxane polymer. However, this method of synthesizing the base polymer requires an expensive hydrosilylation procedure. Additional efforts to achieve a desirable non-corrosive, substantially odor-free stable one-package RTV based on the use of polyalkoxy organopolysiloxane in a more economic manner are shown by Brown et al, U.S. Pat. No. 3,161,614 or U.S. Pat. No. Re. 29,760. Brown et al employed a polyalkoxy end blocked polysiloxane which was based on the use of a mineral acid generating polyalkoxyhalosilane, and a curing catalyst. However, these compositions were found to be unusable because they failed to cure in contact with a tin catalyst, even in the presence of moisture.

As utilized hereinafter, the term "stable" as applied to the one package alkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

In copending application Ser. No. 277,524, filed June 26, 1981, White et al, for One Package, Stable, Moisture Curable, Polyalkoxy-terminated Organopolysiloxane Compositions and Method for Making, assigned to the same assigned as the present invention, room temperature vulcanizable compositions are shown based on the use of a polyalkoxy terminated polydiorganosiloxane in combination with certain silane scavengers for materials having chemically combined hydroxy radicals.

Although valuable, substantially acid-free products have been obtained with the use of such silane scavengers which also can function as stabilizer in the room temperature vulcanizable organopolysiloxane compositions of U.S. Pat. No. 4,395,426, it has been found that the use of such silane scavengers often result in the production of undesirable by-products during the cure of the RTV composition. As shown in copending application RD-13760, White et al, improved results have been achieved by substituting certain organic scavengers for the aforedescribed silane scavengers of U.S. Pat. No. 4,395,526. It has been found, however, that when silane scavengers or organic scavengers having chemically combined enoxy functional groups of the formula,

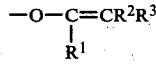   (2)

where $R^1$, $R^2$ and $R^3$ can be the same or different monovalent radicals selected from hydrogen, $C_{(1-8)}$ alkyl, alkenyl, and alkoxy or $C_{(6-13)}$ aryl and aryloxy, are used to effect the substantial removal of materials having chemically combined hydroxy radicals in various one-package room temperature vulcanizable organopolysiloxane compositions, adverse results can occur if used with certain amine accelerators. For example, room temperature vulcanizable organopolysiloxane compositions prepared with a scavenger having an enoxy functional group shown by formula (2) used in combination with an amine accelerator, such as a silyl substituted guanidine, as shown for example by Takago, U.S. Pat. Nos. 4,180,642 and 4,248,993, or dihexylamine, are colorless when freshly made under substantially anhydrous conditions. However, it has been found that such compositions often acquire an unattractive yellow appearance upon aging over an extended period of time, under ambient conditions.

The present invention is based on the discovery that particular accelerators for room temperature vulcanizable organopolysiloxane compositions, for example, diorganosulfoxides, as shown in my copending application Ser. No. 481,527, and nitrogen bases as defined hereinafter, can be utilized in room temperature vulcanizable organopolysiloxane compositions in combination with scavengers having enoxy functionality, as shown by formula (2), to produce RTV compositions which do not exhibit any marked tendency to change color over an extended shelf period in the substantial absence of moisture under ambient conditions.

The expression "exhibits an ability to resist change in color over an extended shelf period" means that absorbance value of the RTV composition does not increase in an amount substantially greater than about 0.015, as compared to its original value when freshly made. For example, some RTV compositions have been found to have an absorbance value of about 0.003 or less, when freshly made by measuring the RTV composition in the unfilled state at 380-420 nm using a 0.5% by weight chloroform solution in a 1 centimeter diameter quartz cell in a Varian Cary 219 spectrophotometer.

A stabilizing or effective amount of scavenger for chemically combined hydroxy radicals in accordance with the practice of the invention means that there can be used from about 0.1 to about 10 parts of scavenger per 100 parts of the alkoxy-terminated oganopolysiloxane or the silanol terminated polydiorganosiloxane. Preferably, 1 or 2 part of scavenger, per 100 parts of polymer can be used.

The expression "an effective amount of cure accelerator" means from about 0.01 to about 10 parts of cure accelerator, per 100 parts of organopolysiloxane.

STATEMENT OF THE INVENTION

There is provided by the present invention, a method of making a room temperature vulcanizable organopolysiloxane composition utilizing a cure rate accelerator and a material having an enoxy functional group as a scavenger for chemically combined hydroxy radicals, which RTV organopolysiloxane composition is substantially colorless in the unfilled state and exhibits an ability to resist a substantial change in color over an extended shelf period under moisture free conditions at ambient temperatures, which comprises, (1) agitating under substantially anhydrous conditions at a temperature in the range of from 0° C. to 180° C., a mixture of ingredients comprising by weight (A) an alkoxy terminated polydiorganosiloxane of the formula,

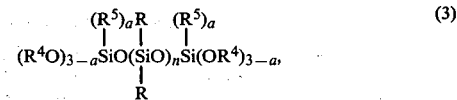   (3)

(B) an effective amount of a condensation catalyst, (C) from 0 to 0.1 part, per part of the alkoxy terminated polydiorganosiloxane of a polyalkoxysilane of the formula,

   (4)

(D) an effective amount of a cure accelerator selected from the class consisting of a diorganosulfoxide and a nitrogen base free of reactive =NH functional groups selected from the class consisting of sterically hindered secondary amines, imidazoles, aminopyridines and tertiary amines and (E) an effective amount of a scavenger having enoxy functionality selected from the class consisting of organo silanes and alkenyl carboxylates, (2) allowing the resulting mixture of ingredients of (1) to age at ambient conditions over an extended period of time, where n and R are as previously defined, $R^4$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^5$ is a monovalent radical selected from enoxy radicals of formula (2), a mixture of enoxy and $R^4O$—, a mixture enoxy and R, a mixture of $R^4O$— and R, and a mixture of enoxy, $R^4O$— and R, a is a whole number equal to 0 to 3 inclusive, b is a whole number equal to 0 or 1, and the sum of a $+$b is equal to 3.

Radicals included within R of formulas (1), (3) and (4) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. There are included in addition to hydrogen within $R^1$, $R^2$ and $R^3$, radicals such as methyl, ethyl, propyl, butyl, pentyl; vinyl, alkenyl, benzyl, phenylether, phenyl, tolyl, xylyl; methoxy, ethoxy, propoxy, phenoxy, cresoxy; $R^1$ and $R^2$ also can be part of a saturated or unsaturated cyclic structure such as tetramethylene radicals joined to —C≡C—. Radicals preferably included within $R^4$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl.

In formulas (1-4), where R–$R^5$ can be more than 1 radical, these radicals can be the same or different.

Some of the organic scavengers which can be used in the practice of the present invention, are for example, alkenyl carboxylates having the formula,

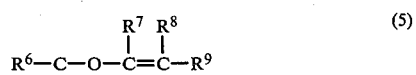

(5)

where $R^6$, $R^7$ and $R^8$ are selected from the same or different monovalent radicals selected from hydrogen, $C_{(1-13)}$ hydrocarbon radicals and $C_{(1-13)}$ substituted hydrocarbon radicals and $R^9$ is selected from $C_{(1-13)}$ monovalent hydrocarbon radicals and substituted monovalent hydrocarbon radicals.

Some of the alkenyl carboxylates which can be used in the practice of the present invention are, for example, isopropenyl acetate, vinyl acetate, but-2-ene-3-yl acetate, isopropenyl propionate, vinyl propionate, cyclohexenyl acetate, cyclopentyl acetate.

Some of the silane scavengers having enoxy functional groups which can be used in the practice of the present invention are enoxysilanes of the formula

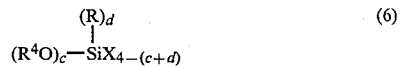

(6)

where $R^4$ is as previously defined, X is an enoxy functional group of formula (2), c is equal to 0 to 3 inclusive, d is 0 or 1, and c+d is equal to 0 to 3 inclusive.

Some of the enoxy silanes included within formula (6), are
methyldimethoxyisopropenoxysilane;
trimethoxyisopropenoxysilane;
methyldimethoxybut-2-ene-2-oxy)silane;
methyldimethoxy(1-phenylethenoxy)silane;
methyldimethoxy-2(1-carboethoxy-propenoxy)silane;
trimethylenoxysilane;
trimethylisopropenoxysilane;
trimethylcyclohexenoxysilane;
methyltriisopropenoxysilane;
methyltricyclohexenoxysilane;
methyldimethoxycyclohexenoxysilane.

Accelerators which can be used in the practice of the present invention are for example, diorganosulfoxides such as dimethylsulfoxide, methylethylsulfoxide, diethylsulfoxide, dipropylsulfoxide, butylpropylsulfoxide, dibutylsulfoxide, diphenylsulfoxide, dibenzylsulfoxide; tetramethylenesulfoxide.

In addition to the above-described diorganosulfoxides there also can be used as accelerators for enhancing the cure rate of room temperature vulcanizable organopolysiloxane compositions included within the practice of the present invention organonitrogen bases such as sterically hindered secondary amines having bulky substituents, for example, dicyclopentylamine dicyclohexyl amine, di-t-butyl ethylene diamine, di-t-butylamine, diisopropylamine, t-butyl-isopropylamine, t-butylcyclohexylamine, isopropylcyclohexyl amine, isopropylcyclohexyl amine; imidazoles such as, imidazole, N-methylimidazole, N-methyl-2-methyl imidazole, N-methyl-4-methylimidazole, N-methyl-2,4,5-trimethylimidazole, benzimidazole, N-methyl benzimidazole, N-methyl-2-benzimidazole, N-butyl-imidazole; tertiary amines such as N,N,N',N'-tetramethyl-1,3-diamino propane, 1,4-diazabicyclo[2.22octane, N,N,N',N'-tetramethylethylene diamine, N,N,N',N'-tetraethylene diamine, N,N'-dimethyl-1, 4-diazacyclohexane.

When alkenyl carboxylates are used as a scavenger for chemically combined hydroxy radicals aminopyridines, such as N,N-dimethylamino pyridine, N,N-dibutylamino pyridine, 4-(4'-methylpiperidyl)pyridine can be used as cure accelerators.

As previously described the alkoxy terminated organopolysiloxane of formula (3) can be made by using a polyalkoxysilane with a silanol-terminated polydiorganosiloxane. The silanol-terminated polydiorganosiloxanes which can be used to make the polyalkoxyorganopolysiloxanes are well known and preferably have a viscosity in the range of from about 100 to about 400,000 centipoise and more preferred from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (1), are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Pat. No. 835,790.

Effective amounts of the condensation catalysts which can be used in the practice of the present invention to facilitate the cure of the RTV compositions are, for example, 0.001 to 5 parts based on the weight of 100 parts of the silanol-terminated polydiorganosiloxane of formula (1). There are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate;.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions made in accordance with the practice of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example stirring, a mixture of materials which can consist of the polyalkoxy terminated diorganopolysiloxane, organic scavenger, cross-linking silane of formula (3) which can be optional, and amine accelerator, where the blending is performed in a substantial absence of atmospheric moisture. Thereafter, the condensation catalyst is added also in the substantial absence of atmospheric moisture.

As used hereinafter, the expressions "moisture-free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Temperatures can vary from about 0° C. to about 180° C. depending upon the degree of blending, the type and amount of filler.

A preferred procedure for making the RTV compositions of the present invention is to agitate under substantially anhydrous conditions, a mixture of the polyalkoxy terminated organopolysiloxane, filler, along with an amount of polyalkoxysilane of formula (3) sufficient to effect the substantial elimination of hydroxy functional groups in the mixture. This "end-capping" procedure can require several minutes, hours, or even days, depending upon such factors as the amount of silanol on the filler, the nature of the $OR^4$ radical on the cross-linking silane, etc. There then can be added to the substantially silanol-free mixture the condensation catalyst, cross-linking silane or mixture thereof, along with other ingredients, for example, the curing accelerator and pigments.

In order that those skilled in the art will be better able to practice the invention, the following examples are given by way of illustration and not by way of limitation. All parts are by weight.

EXAMPLE 1

A room temperature vulcanizable organopolysiloxane composition was prepared by blending together under substantially anhydrous conditions, 100 parts of a polydimethylsiloxane having terminal methyldimethoxysiloxy units and a viscosity of about 20,000 centipoise at 25° C., 0.2 part of dibutyltindiacetate, 2 parts of an enoxy stabilizer and 0.3 to 1 part of a cure accelerator. A 5% chloroform solution of the above room temperature vulcanizable composition was prepared and measured for absorbance value at 380 nm and 420 nm using a 1 centimeter diameter quartz sample cell in a Varian Cary 219 spectrophotometer. The absorbance value of the polydimethylsiloxane was found to be approximately 0.001 at 380 nm and about 0.001 at 420 nm. The RTV composition when initially prepared has approximately the same value when measured immediately after preparation.

The above RTV organopolysiloxane solutions were then placed in tightly closed screwed cap vails and were heat aged at 100° C. for 43 hours in a silicone oil bath in a dry box under an inert atmosphere. After heat aging, the heat aged polymer solutions were then measured for possible change in absorbance following the same procedure as previously described. In addition, aliquots of the solutions were also removed and exposed to the atmosphere in a 58% humidity chamber to determine tack-free times. The following results were obtained, where the scavenger is isopropenylacetate (IPA), or methyldimethoxyisopropenoxysilane (MDIS), "hex$_2$NH" is dihexylamine, "colored" means that a 0.5% solution in chloroform of the heat aged RTV organopolysiloxane solution had an absorbance of greater than 0.015 at 380 nm, "colorless" means that the heat aged RTV organopolysiloxane solution had an absorbance value of less than 0.011 at 380 nm and "TFT" is tack-free time in minutes after the 43 hour, 100° C. heat age:

TABLE I

| RTV Composition: | | Silicone Polymer Bu$_2$Sn(OAc)$_2$ Scavenger | Parts 100 0.2 2 | |
|---|---|---|---|---|
| Accelerator | Parts | TFT (min) 0 hr | 43h @ 100° C. | Color |
| IPA | hex$_2$NH | 0.6 | 60 | 50 | Colored |
| " | N—methylimidazole | 0.6 | 90 | 150 | Colorless |
| " | N,N—dibutylaminopyridine | 1.0 | 90 | 115 | " |
| " | dimethylsulfoxide | 0.8 | 90 | 150 | " |
| MDIS | hex$_2$NH | 0.6 | 60 | 50 | Colored |
| " | N—methylimidazole | 0.6 | 150 | 240 | Colorless |
| " | dimethylsulfoxide | 0.8 | 90 | 180 | " |

The above results show that substantially colorless or very faint yellow room temperature vulcanizable organopolysiloxane compositions can be made in accordance with the practice of the present invention which are stable after an extended shelf period at ambient temperatures or its equivalent accelerated heat age at 100° C. for 43 hours. It was further found that the colored heat aged RTV compositions using dihexylamine as an accelerator were an unacceptable deep yellow. Substantially similar color results were obtained when solutions of the same RTV compositions were examined at 450 nm.

An additional evaluation was made to determine the extent of color occurring using various nitrogen organic bases which are affective cure accelerators for room temperature vulcanizable compositions in accordance with the practice of the present invention. Decamethylcyclopentasiloxane was used in place of the methyldimethoxy siloxy terminated polydimethylsiloxane of Example 1 as the base polydimethylsiloxane polymer. There was used 100 parts of the aforementioned cyclic polydimethylsiloxane with 2 parts of scavenger, 0.2 part of dibutyltindiacetate, and 0.6 part of nitrogen base accelerator. Identical mixture were prepared to which 0.5–1.0. equivalents of methanol were added. The various solutions were heat aged at 95°±5° C. in glass vials in a dry box. The following results were obtained, where the term "colorless" is as previously defined, "very faint yellow" has an absorbance value below 0.012, while light yellow and yellow exceed an absorbance value of 0.015 at 380 nm:

TABLE II

| | | Color After 48 hrs at 95 ± 5° C. | |
|---|---|---|---|
| Accelerator | Parts | IPA | MDIS |
| None | | Colorless | Very Faint Yellow |
| Dihexylamine | 0.6 | Light Yellow | Yellow |
| Di-t-butylethylenediamine | 0.3 | Colorless | Very Faint Yellow |
| Dicyclohexylamine | 0.6 | — | Colorless |
| N—methylimidazole | 0.6 | Colorless | Colorless |

The above results further establish the unique aspects of the present invention with respect to making room temperature vulcanizable organopolysiloxane compositions having an enoxy functional stabilizer and the employment of particular cure rate accelerators with respect to their ability to provide substantially colorless room temperature vulcanizable organopolysiloxane compositions after an extended shelf period under ambient conditions or equivalent accelerated heat aging.

Although the above examples are directed to the use of only a few of the very many enoxy containing scavengers, cure accelerators, condensation catalysts, and alkoxy terminated polydiorganosiloxane polymer, it should be understood that the present invention is directed to a much broader variety of such ingredients as shown in the description preceding these examples. For example, in instances where silanol terminated polydiorganosiloxane is used to make RTV compositions, there can be used from about 0.001 to about 0.1 part of alkoxy silane of formula (4) per part of the silanol terminated polydiorganosiloxane.

What I claim as new and desire to secure by Letters Patent of the United States is:

1. A method of making a room temperature vulcanizable organopolysiloxane composition utilizing a cure rate accelerator and a material having an enoxy functional group as a scavenger for chemically combined hydroxy radicals, which RTV organopolysiloxane composition is substantially colorless and exhibits an ability to resist a substantial change in color over an extended shelf period under moisture free conditions at ambient temperatures, which comprises, (1) agitating under substantially anhydrous conditions at a temperature in the range of from 0° C. to 180° C., a mixture of ingredients comprising by weight,
(A) an alkoxy terminated polydiorganosiloxane of the formula,

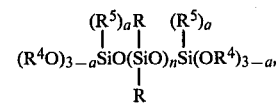

(B) an effective amount of a condensation catalyst,
(C) from 0 to 0.1 part per part of the alkoxy terminated polydiorganosiloxane of a polyalkoxysilane of the formula,

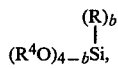

(D) an effective amount of a cure accelerator selected from the class consisting of a diorganosulfoxide and a nitrogen base free of reactive =NH functional groups selected from the class consisting of sterically hindered secondary amines, imidazoles, aminopyridines and tertiary amines and (E) an effective amount of a scavenger having enoxy functionality selected from the class consisting of organo silanes and alkenyl carboxylates, (2) allowing the resulting mixture of ingredients of (1) to age at ambient conditions over an extended period of time, where n is an integer having a value of from 50 to about 2500, R is a $C_{(1-13)}$ monovalent substituted or unsubstituted hydrocarbon radical, $R^4$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^5$ is a monovalent radical selected from enoxy radicals of the formula

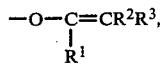

where $R^1$, $R^2$ and $R^3$ can be the same or different monovalent radicals selected from hydrogen, $C_{(1-8)}$ alkyl, alkenyl, and alkoxy or $C_{(6-13)}$ aryl and aryloxy, a is a whole number equal to 0 to 2 inclusive and b is a whole number equal to 0 or 1.

2. A method in accordance with claim 1, where the enoxy scavenger is isopropenylacetate.

3. A method in accordance with claim 1, where the enoxy scavenger is methyldimethoxyisopropenoxysilane.

4. A method in accordance with claim 1, where the cure accelerator is dimethylsulfoxide.

5. A method in accordance with claim 1, where the cure accelerator is N-methylimidazole.

6. A method in accordance with claim 1, where the cure accelerator is N,N-dibutylaminopyridine.

7. A method in accordance with claim 1, where the cure accelerator is dicyclohexylamine.

8. A method in accordance with claim 1, where the condensation catalyst is dibutyltindiacetate.

9. A method in accordance with claim 1, where the alkoxy terminated polydiorganosiloxane is a methyldimethoxypolydimethylsiloxane.

10. A method for making a room temperature vulcanizable composition which resists color change upon aging comprising, (1) agitating under substantially anhydrous conditions at a temperature in the range of from 0°C. to 180° C., a mixture of ingredients comprising by weight
  (A) a silanol terminated polydiorganosiloxane
  (B) an effective amount of a condensation catalyst
  (C) 0.001 to 0.1 part per part of the silanol terminated polydiorganosiloxane of a cross-linking polyalkoxysilane
  (D) an effective amount of a cure accelerator selected from the class consisting of a diorganosulfoxide and a nitrogen base free of reactive =NH functional groups selected from the class consisting of sterically hindered secondary amines, imidazoles, aminopyridines and tertiary amines and
  (E) an effective amount of a scavenger having enoxy functionality selected from the class consisting of organo silanes and alkenyl carboxylates, (2) allowing the resulting mixture of ingredients of (1) to age at ambient conditions over an extended period of time.

11. A method for making a room temperature vulcanizable composition which resists color change upon aging comprising, (1) agitating under substantially anhydrous conditions at a temperature in the range of from 0° C. to 180° C., a mixture of ingredients comprising by weight
  (A) a silanol terminated polydiorganosiloxane
  (B) an effective amount of a condensation catalyst
  (C) an effective amount of a cure accelerator selected from the class consisting of a diorganosulfoxide and a nitrogen base free of reactive =NH functional groups selected from the class consisting of sterically hindered secondary amines, imidazoles, aminopyridines and tertiary amines and
  (D) an effective amount of a scavenger having the formula,

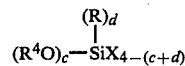

(2) allowing the resulting mixture of ingredients of (1) to age at ambient conditions over an extended period of time, where X is an enoxy functional group of the formula,

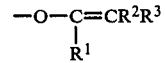

R is a $C_{(1-13)}$ monovalent substituted or unsubstituted hydrocarbon radical, $R^1$, $R^2$ and $R^3$ can be the same or different monovalent radicals selected from hydrogen, $C_{(1-8)}$ alkyl, alkenyl, and alkoxy or $C_{(6-13)}$ aryl and aryloxy, $R^4$ is a $C_{(1-8)}$ aliphatic organic radical selected from alkyl radicals, alkylether radicals, alkylester radicals, alkylketone radicals and alkylcyano or a $C_{(7-13)}$ aralkyl radical, c is equal to 0 to 3 inclusive, d is 0 or 1, and c+d is equal to 0 to 3 inclusive.

* * * * *